(12) United States Patent
Tallis

(10) Patent No.: US 8,354,084 B2
(45) Date of Patent: Jan. 15, 2013

(54) CRACKING FURNACE

(75) Inventor: William Tallis, Warwickshire (GB)

(73) Assignee: Technip France S.A.S., Courbevoie (FR)

( * ) Notice: Subject to any disclaimer, the term of this patent is extended or adjusted under 35 U.S.C. 154(b) by 0 days.

(21) Appl. No.: 13/050,533

(22) Filed: Mar. 17, 2011

(65) Prior Publication Data

US 2011/0268623 A1 Nov. 3, 2011

Related U.S. Application Data

(63) Continuation of application No. PCT/GB2009/002253, filed on Sep. 18, 2009.

(60) Provisional application No. 61/098,564, filed on Sep. 19, 2008.

(30) Foreign Application Priority Data

Sep. 19, 2008 (GB) .................................. 0817219.9

(51) Int. Cl.
*B01J 8/00* (2006.01)
*B01J 19/00* (2006.01)

(52) U.S. Cl. ......... 422/659; 422/198; 422/202; 422/655

(58) Field of Classification Search .................. 422/198, 422/202, 659, 655

See application file for complete search history.

(56) References Cited

U.S. PATENT DOCUMENTS

| 85,149 A | 12/1808 | Van Amringe |
|---|---|---|
| D16,763 S | 3/1857 | Watson |
| 892,919 A | 7/1908 | Wedgefuth |
| 1,336,450 A * | 4/1920 | Wade ............................ 422/149 |
| 1,363,416 A | 12/1920 | Hooker |
| 1,818,082 A | 8/1931 | Mott |
| 1,913,417 A | 6/1933 | Ulrich |
| 2,115,769 A | 5/1938 | Harris |
| 2,246,418 A | 6/1941 | Ward |
| 2,613,993 A | 10/1952 | Holden |
| 2,663,321 A | 12/1953 | Jantsch |
| 2,832,374 A | 4/1958 | November |
| RE24,783 E | 2/1960 | Humphrey |
| 3,117,821 A | 1/1964 | Mylting |
| 3,188,586 A | 6/1965 | Martin et al. |
| 3,201,723 A | 8/1965 | Martin et al. |
| 3,227,525 A | 1/1966 | Degeorges et al. |
| 3,345,590 A | 10/1967 | Wolfgang et al. |

(Continued)

FOREIGN PATENT DOCUMENTS

AU 77718/75 * 8/1976

(Continued)

OTHER PUBLICATIONS

Japanese Office Action for Application No. 2008-557828 dated Sep. 20, 2011.

(Continued)

*Primary Examiner* — Walter D Griffin
*Assistant Examiner* — Lessanework Seifu
(74) *Attorney, Agent, or Firm* — Marshall, Gerstein & Borun LLP; Michael P. Furmanek

(57) ABSTRACT

Piping for use as a pyrolysis tube in a cracking furnace, wherein the tube is formed such that it has at least one section whose centerline curves in three dimensions, to induce swirl flow in the tube. The tube can be formed as a helix.

18 Claims, 5 Drawing Sheets

U.S. PATENT DOCUMENTS

| | | | |
|---|---|---|---|
| 3,578,075 | A | 5/1971 | Winter |
| 3,606,780 | A | 9/1971 | Nagahara |
| 3,610,289 | A | 10/1971 | Moss et al. |
| 3,612,175 | A | 10/1971 | Ford et al. |
| 3,647,187 | A | 3/1972 | Dannewitz et al. |
| 3,713,784 | A | 1/1973 | Pohl et al. |
| 3,719,207 | A | 3/1973 | Takeda |
| 3,779,312 | A | 12/1973 | Withers, Jr. et al. |
| 4,061,562 | A | 12/1977 | McKinney et al. |
| 4,317,353 | A | 3/1982 | Geppelt et al. |
| T103901 | I4 | 2/1984 | Lupke |
| 4,499,055 | A | 2/1985 | DiNicolantonio et al. |
| 4,595,058 | A | 6/1986 | Nations |
| 4,827,074 | A | 5/1989 | Suwa et al. |
| 4,995,450 | A | 2/1991 | Geppelt et al. |
| 5,167,483 | A | 12/1992 | Gardiner |
| 5,383,100 | A | 1/1995 | Kikos |
| 5,553,976 | A | 9/1996 | Korsgaard |
| 5,681,450 | A | 10/1997 | Chitnis et al. |
| 5,711,744 | A | 1/1998 | Strawcutter et al. |
| 5,799,623 | A | 9/1998 | Born et al. |
| 6,039,754 | A | 3/2000 | Caro |
| 6,343,516 | B1 | 2/2002 | Marrelli |
| 6,399,031 | B1 | 6/2002 | Herrmann et al. |
| 6,419,885 | B1 | 7/2002 | Di Nicolantonio et al. |
| 6,481,492 | B1 | 11/2002 | Zhu et al. |
| 6,528,027 | B1 * | 3/2003 | Brewer et al. ............... 422/200 |
| 6,719,953 | B2 | 4/2004 | Di Nicolantonio et al. |
| 6,776,194 | B2 | 8/2004 | Houston et al. |
| 6,896,007 | B2 | 5/2005 | Cymbalisty |
| 6,997,214 | B2 | 2/2006 | Kuo |
| 7,114,524 | B2 | 10/2006 | Houston et al. |
| 7,749,462 | B2 | 7/2010 | Caro et al. |
| 2002/0043022 | A1 | 4/2002 | Warren |
| 2002/0179166 | A1 | 12/2002 | Houston et al. |
| 2002/0179494 | A1 | 12/2002 | Doerksen |
| 2004/0000350 | A1 | 1/2004 | Cymbalisty |
| 2004/0134557 | A1 | 7/2004 | Cymbalisty |
| 2005/0131263 | A1 | 6/2005 | Wolpert et al. |
| 2006/0102327 | A1 | 5/2006 | Inui et al. |
| 2006/0137864 | A1 | 6/2006 | Jakobi et al. |
| 2007/0021707 | A1 | 1/2007 | Caro et al. |
| 2007/0156078 | A1 | 7/2007 | Caro et al. |
| 2008/0030023 | A1 | 2/2008 | Kurata et al. |
| 2008/0262599 | A1 | 10/2008 | Caro et al. |

FOREIGN PATENT DOCUMENTS

| | | |
|---|---|---|
| CA | 1 119 853 A1 | 3/1982 |
| DE | 100 42 768 | 3/2002 |
| EP | 0 305 799 | 3/1989 |
| EP | 0 712 711 | 5/1996 |
| EP | 1 127 557 | 8/2001 |
| EP | 1 396 291 A1 | 3/2004 |
| FR | 2 248 015 | 5/1975 |
| GB | 0 499 058 | 1/1939 |
| GB | 0 729 618 | 5/1955 |
| GB | 0 969 796 | 9/1964 |
| GB | 2 192 966 | 1/1988 |
| JP | 40-020630 Y1 | 7/1965 |
| JP | 57-027740 | 2/1982 |
| JP | 58-070834 A | 4/1983 |
| JP | 2129494 A | 5/1990 |
| JP | 09-248445 A | 9/1997 |
| JP | 2001-262159 A | 9/2001 |
| JP | 2002-533157 T | 10/2002 |
| KR | 1994-0000769 B1 | 4/1998 |
| RU | 2 110 554 | 5/1998 |
| SU | 531 993 | 10/1976 |
| WO | WO-86/04951 | 8/1986 |
| WO | WO-92/11931 | 7/1992 |
| WO | WO-95/09585 | 4/1995 |
| WO | WO-97/28232 | 8/1997 |
| WO | WO-97/28637 | 8/1997 |
| WO | WO-98/53764 | 12/1998 |
| WO | WO-98/56872 | 12/1998 |
| WO | WO-00/38591 | 7/2000 |
| WO | WO-01/18406 A1 | 3/2001 |
| WO | WO 02/47576 | 6/2002 |
| WO | WO 02/070626 | 9/2002 |
| WO | WO-02/093063 | 11/2002 |
| WO | WO-02/093064 | 11/2002 |
| WO | WO-02/098325 | 12/2002 |
| WO | WO-03/069209 | 8/2003 |
| WO | WO-2004/015237 A2 | 2/2004 |
| WO | WO-2004/083705 A1 | 9/2004 |
| WO | WO-2004/083706 A1 | 9/2004 |
| WO | WO-2005/075607 A1 | 8/2005 |
| WO | WO-2006/018251 | 2/2006 |
| WO | WO-2006/032877 | 3/2006 |
| WO | WO 2006/032877 * | 3/2006 |
| WO | WO-2007/104952 A2 | 9/2007 |

OTHER PUBLICATIONS

Japanese Office Action for Application No. 2007-532949 dated Jul. 26, 2011.

Examination Report for Canadian Patent Application No. 2,519,011 issued Feb. 7, 2012.

Canadian Office Action for Application No. 2,519,011, dated Jul. 9, 2010.

Caro et al., "A Novel Approach to Ethylene Furnace Coil Design," 18th Annual Ethylene Producers' Conference (2006).

Caro et al., "A Novel Approach to Ethylene Furnace Coil Design," Presentation at the 18th Annual Ethylene Producers' Conference (2006).

English-language translation of Japanese Office Action for Application No. 2006-505985, dated Feb. 4, 2010.

European Search Report for Application No. 07024102, dated Apr. 24, 2008.

European Search Report for Application No. 09001322, dated Jul. 3, 2009.

European Search Report for Application No. 09005580, dated May 13, 2009.

International Search Report for International Application No. PCT/GB2004/001663, dated Jun. 23, 2004.

International Search Report for International Application No. PCT/GB2005/003632, dated Dec. 5, 2005.

International Search Report for International Application No. PCT/GB2007/000849, dated Jan. 23, 2008.

Matteo, "Mechanistic modeling of slug dissipation in helical pipes," Thesis submitted to the University of Tulsa Graduate School, Petroleum Engineering (2003).

Ramirez, "Slug dissipation in helical pipes," Thesis submitted to the University of Tulsa Graduate School, Mechanical Engineering (2000).

Written Opinion for Application No. PCT/GB04/001163, dated Jun. 23, 2004.

Written Opinion for Application No. PCT/GB2004/001170, dated Jun. 21, 2004.

Written Opinion for International Application No. PCT/GB2005/003632, dated Dec. 5, 2005.

* cited by examiner

CRACKING FURNACE

CROSS-REFERENCE TO RELATED APPLICATIONS

This is a continuation of International Patent Application No. PCT/GB2009/002253, having an international filing date of Sep. 18, 2009, and which claims priority to Great Britain Application No. 0817219.9, filed Sep. 19, 2008 and United States Provisional Application No. 61/098,564, filed Sep. 19, 2008, the contents of each of which are expressly incorporated herein by reference.

FIELD OF THE DISCLOSURE

The present invention relates to pyrolysis tubing for use in cracking furnaces.

BACKGROUND

Cracking furnaces are used in particular in the production of ethylene. In the steam cracking process for ethylene, a hydrocarbon feedstock is diluted with steam, and then heated rapidly to a high temperature by passing it through tubes (usually referred to as "furnace coils") in a furnace. The high temperature decomposes the hydrocarbon feedstock. The output stream, containing a broad mixture of hydrocarbons from the pyrolysis reactions in the pyrolysis tubes plus unreacted components of feedstock, is then quenched to prevent recombination of the products. The cooled stream can then be processed through a series of distillation and other separation operations in which the various products of the cracking operation are separated.

Known cracking furnaces suffer from a number of problems. Because of the very low residence time of the feedstock and steam flowing through the tubes in the furnace (a few tenths of a second), the furnace and the tubes must be maintained at a very high temperature in order to achieve the necessary rapid heating to achieve pyrolysis. A large amount of fuel is thus required to fire the furnace.

Further, the very high temperature of the tubes in the furnace leads to the deposition of coke on the inside of the tubes. This coking is particularly unwelcome, as the presence of a layer of coke on the inside of the tube reduces heat transfer from the furnace to the feedstock, and so affects yield. It also increases the pressure drop in the pyrolysis tube, which also reduces yield.

If the coke deposition is sufficiently severe, it is normally necessary to take a furnace out of service periodically (typically every 20 to 60 days) to allow decoking of the tubes (such as by steam cleaning). Since each furnace represents a very large capital investment, it is desirable to keep such downtime to a minimum.

In U.S. Pat. No. 6,481,492 there is a proposed design of pyrolysis tube consisting of a tube of circular cross-section divided into two flow passages by a twisted baffle. The intention is to promote lateral movement of process gases in the tube, reducing the thickness of the boundary layer at the wall of each passage, so promoting the efficiency of the heat transfer between the furnace outside the tube and the gases in the flow passages. The aim is to lower the temperature of the inner surfaces of the tube and reduce coking.

However, the use of a twisted baffle in the proposed manner results in the overall cross-section or the tube being divided into two passages each with a semi-circular cross-section. This baffle creates a resistance to the process gases, reducing their flow speed through the furnace and increasing the pressure drop. The use of semi-circular flow passages is thus not optimal. The problem of increased flow resistance is acknowledged in the document, for example at column 7 lines 30-32. It is proposed to deal with the problem by providing a twisted baffle at only certain-places in the furnace tube. However, in such arrangements gas which is initially flowing along a single passage of circular cross-section encounters the front end of a baffle, which itself provides an obstruction to the flow and a potential opportunity for fouling or coke deposition. Moreover, because of the high Reynolds numbers which are involved in pyrolysis furnace flows, normal flow will reassert itself within a few tube diameters of the downstream end of a twisted baffle, so requiring several sections of baffled tube for the overall passage of a tube through the furnace, each one creating an obstruction to flow at the upstream end and a resistance to flow.

A much older proposal for the design of a pyrolysis tube in a cracker furnace was made in AU 77718/75. In this proposal it was considered that the yield of ethylene from the cracking processes could be increased by providing a pyrolysis tube which extends through the furnace in a Convoluted manner. Helical, double helical, spiral, zig-zag and wavy convolutions were proposed. It was suggested that it is desirable to maximise the surface area to volume ratio of the tube so as to facilitate the necessary heat transfer to the process gas, and that the maximum ratio is achieved by minimising the tube diameter within practical limitations. This pointed to using a smaller diameter tube with a longer streamwise length, i.e more convoluted, which would then have a larger tube surface area to tube volume ratio than a wider diameter tube which is straight. In keeping with this aim, the embodiment of AU 77718/75 shown in the drawing has a pyrolysis tube with a large helical amplitude compared to the diameter of the tube (at least twice the internal diameter of the tube insofar as this can be determined from the drawing) and a high helix angle (about 70°-80°). However, the longer length and smaller tube diameter required by such a design would lead to a higher pressure drop and be detrimental to yield.

From WO 2006/032877 and WO 2007/104952 it is proposed to provide a cracking furnace with at least one pyrolysis tube passing through the furnace, the pyrolysis tube defining a flow passage with a cross-section which is substantially circular, wherein the pyrolysis tube is formed such that it has at least one portion with a helical centreline. Similar proposals are made in Paper 191g entitled "A novel approach to ethylene furnace coil design", by William Tallis, ColM Caro and Chinh Dang, as prepared for presentation at the 2006 AIChE Spring National Meeting in Orlando Fla. on 23-27 Apr. 2006.

GENERAL DESCRIPTION

Viewed from a first aspect the invention provides a cracking furnace least one pyrolysis tube passing through the furnace, the pyrolysis tube low passage with-a cross-section which is substantially circular, flow passage having a centreline which is helical over at least part of the extent of the pyrolysis tube extending in the furnace, wherein a downstream half of said extent of the pyrolysis tube extending in the furnace comprises a greater amount of helical passage than an upstream half of said extent of the pyrolysis tube.

The inventor has recognised that because the use of a helical tube portion tends to lead to a pressure drop greater than that obtained from a straight tube portion, it is advantageous to select the downstream half of the length of the pyrolysis tube as the best place to use a helical passage. The inventor has realised that the high temperature gradient across the tube wall in the first half of the pyrolysis tube, between the high temperature in the furnace and the process gases in the tube, is effective in raising temperature of the process gases without the need for the mixing promoted by a helical tube portion. In the downstream half of the pyrolysis tube, where the gases have been brought up substantially to the required reaction temperature, it is desirable to maximise mixing with the water vapour used as a diluent in the process and so minimise back reaction. Hence, the use of a greater amount of helical passage in the downstream half of the length of the pyrolysis tube compared to the upstream half is preferred.

Pyrolysis reactions involve breaking up large hydrocarbon molecules into smaller molecules. Thus the reactions involve the production of more than one molecule of product for each molecule of feedstock, so that a lower pressure drop in the reactor which can be achieved through the use of a pyrolysis tube according to the invention in its first aspect (compared to the proposals of U.S. Pat. No. 6,451,492 or AU 77718/75) provides a benefit from the lower avenge pressure, because it will reduce the possibility of the product molecules recombining to form the feedstock or other unwanted by-products. In other words, if a lower pressure drop can be achieved, then the average pressure of the process gases in the pyrolysis tube of the furnace can be less, minimising the opportunity for back reaction. Moreover, the pyrolysis process involves the use of water vapour as a diluent, and by providing a helical passage in the downstream half of the pyrolysis tube, the product molecules are kept well mixed with the water molecules, again minimising the contact of the product molecules with each other and so tending to reduce back reaction.

The reference to the extent of the pyrolysis tube extending in the furnace is intended to mean the longitudinal extent of the envelope containing the pyrolysis tube in the furnace. Where the pyrolysis tube is helical, the envelope is the imaginary envelope extending longitudinally and having a swept width equal to the swept width of the helical tube portion. Where the pyrolysis tube is non-helical (i.e. straight or curving in two-dimensions e.g. at a "U"-bend), then the envelope is defined by the outer surface of the pyrolysis tube. Thus the upstream half of the extent of the pyrolysis tube corresponds to the upstream half of the length of the envelope, whilst the downstream half of the extent of the pyrolysis tube corresponds to the downstream half of the length of the envelope.

The reference to the "amount of helical passage" in any given half of the extent of the pyrolysis tube is intended to refer to an amount as measured by the length of the path of the helical centreline (rather than a length of a straight line between two end points of the helical passage).

The upstream half of the pyrolysis tube may comprise at least one helical tube portion with a helical centreline. Thus the upstream half of the pyrolysis tube may comprise one or more helical tube portions, but to a lesser extent than in the downstream half. In some processes, it may be desired to promote mixing at some point in the upstream half of the pyrolysis tube, so this half may comprise one or more helical tube portions, but to a lesser extent than in the downstream half. Preferably at least 30% of the upstream half of the pyrolysis tube portion comprises a non-helical (for example straight) passage, more preferably 40 or 50 or 60 or 70 or 80%. For some embodiments, substantially the entire upstream half (i.e. 100%) of the pyrolysis tube may comprise a non-helical passage. In these embodiments, the "amount of helical passage" in the upstream half is an amount equal to zero. By "non-helical passage" it is meant that the centreline of the passage may be straight or it may curve in two dimensions.

The downstream of the pyrolysis tube may comprise at least one non-helical tube portion. Thus the downstream half of the pyrolysis tube may comprise or more non-helical tube portions, but to a lesser extent than in the upstream half. Again there should be more helical passage in the downstream half than in the upstream half. Preferably at least 30% of the downstream half of the pyrolysis tube comprises a helical passage, more preferably 40 or 50 or 60 or 70 or 80 or 90%. In certain embodiments, substantially the entire downstream half (i.e. 100%) of the pyrolysis tube comprises a helical passage.

In a preferred embodiment the pyrolysis tube is "U" shaped, wherein said upstream half of the pyrolysis tube comprises a first leg of the "U" in which there is at least one tube portion defining a flow passage With a substantially straight centreline, and wherein said downstream half of the pyrolysis tube portion comprises a second leg of the "U" in which there is at least one tube portion defining a flow passage with a helical centreline. At the outlet of the second leg there is preferably a straight portion, more preferably with a transitional portion (to be described in more detail below) between the helical portion and the straight portion.

In other embodiments the pyrolysis tube is "M" or "W" shaped. In these embodiments, the upstream half will normally be the first two legs of the "M" or "W" respectively, and the downstream half the second two legs of the "M" or respectively. In other embodiments, the pyrolysis tube may have just a single pass through the furnace, for example from top to bottom or bottom to top, and the single pass can then be considered as being, divided into upstream and downstream halves, even though there may be no identifying feature such as a bend or join at the halfway point. The invention in its first aspect is also applicable to other known pyrolysis tube configurations, modified to have a helical flow in accordance with the teachings of that aspect of the invention.

Where the pyrolysis tube defines a flow passage with a helical centreline, this part of the pyrolysis tube is a helical tube portion. In certain preferred embodiments, the helical tube portion may be supported offset from the central longitudinal axis of an imaginary envelope which extends longitudinally and has a width equal to the swept width of the helical tube portion. This may simplify manufacture of the pyrolysis tube. Preferably, however, the pyrolysis tube further comprises a transitional portion longitudinally adjacent to the helical tube portion, the centreline of the flow passage in the transitional tube portion being substantially aligned with the helical centreline of the helical tube portion at a first end of the transitional tube portion adjacent to the helical tube portion, and the centreline of the flow passage in the transitional tube portion being substantially aligned with the central longitudinal axis of the envelope of the helical tube portion at a second end of the transitional tube portion remote from the helical tube portion.

Such a preferred arrangement means that the helical centre line can be brought closer to the central longitudinal axis of the envelope of the helical tube portion. This can reduce any offset from the central longitudinal axis. The use of a transitional tube portion is in fact of independent patentable significance.

Viewed from a second aspect the invention provides a cracking furnace with at least one pyrolysis tube passing through the furnace, the pyrolysis tube defining a flow passage, and the pyrolysis tube comprising a helical tube portion in which the centreline of the flow passage follows a helical path, and the pyrolysis tube comprising a transitional tube portion longitudinally adjacent to the helical tube portion, the centreline of the flow passage in the transitional tube portion being substantially aligned with the helical centreline of the helical tube portion at a first end of the transitional tube portion adjacent to the helical tube portion, and the centreline of the flow passage in the transitional tube portion being substantially aligned with the central longitudinal axis of the envelope of the helical tube portion at a second cud of the transitional tube portion remote from the helical tube portion.

The second aspect of the invention is useful with any helical pyrolysis tube portion, irrespective of the amount of helical passage in the upstream or downstream half of the overall pyrolysis tube. It may for example be used with the pyrolysis tubes disclosed in WO 2006/032877 or WO 2007/104952.

There are a number of advantages in providing a transitional tube portion. First, there is a process advantage in that gases flowing into the helical tube portion can pass through a transitional zone in the transitional tube portion, thereby avoiding a sudden change from flow in a straight tube portion to flow in the helical tube portion. This management of the flow can contribute to avoiding undesirable pressure drops. Similarly, at the downstream end of a helical tube portion there may be a transitional zone in a transitional tube portion to a straight tube portion.

A second advantage providing a transitional tube portion relates to the structure of the pyrolysis tube. If for example a pyrolysis tube is supported at its inlet in a position offset from the central longitudinal axis, the weight of the pyrolysis tube will cause a bending moment at the support. By the use of a transitional tube portion in which the centreline of the flow passage substantially aligns with the central longitudinal axis of the envelope of the helical tube portion, the bending moment may be correspondingly reduced.

A third advantage of the use of a transitional tube portion, particularly at the inlet or outlet to the furnace, is that the envelope occupied by the pyrolysis tube the space it furnace, can be generally closer to that of a conventional tube. Thus, where the pyrolysis tube is to be used to replace an existing pyrolysis tube in a refit, the use of a transitional tube portion can make the refit easier and more practicable.

The transitional tube may be formed such that its centreline curves in various ways to achieve the required alignment at each end. In certain preferred embodiments the centreline of the flow passage in the transitional tube portion follows a helical path, and the amplitude of the helical centreline in the transitional tube portion reduces in a direction away from the helical tube portion to substantially zero so as to bring the centreline of the flow passage in the transitional tube portion substantially into alignment with the central longitudinal axis.

It will be appreciated that the advantages mentioned above in relation to the use of a transitional tube portion are particularly achieved in these preferred arrangements in which the transitional tube has a helical centre line of reducing amplitude.

A transitional tube may serve to connect the helical tube portion to a non-helical portion. The non-helical portion may be a straight portion, for example provided at an inlet to or an outlet from a furnace.

A transitional tube portion may be provided at al inlet end of the pyrolysis tube. A transitional tube portion may be provided at an outlet end of the pyrolysis tube. Preferably, a first transitional tube portion is provided at an inlet end of the pyrolysis tube and a second transitional tube portion is provided at an outlet end of the pyrolysis tube.

The discussion below, to the end of the description, relates to both the first and second aspects of the invention.

In this specification the amplitude of the helix refers to the extent of displacement from a mean position to a lateral extreme. So, in the case of the pyrolysis tubing portion having a helical centreline, the amplitude is one half of the full lateral width of the helical centreline.

It has been found that when process gases flow through a portion of tube according to the first aspect of the invention, the gases "swirl" along the tube (i.e. a component of the motion is around the centreline of the tube). This "swirl flow" has a number of advantages over conventional flow. One such advantage is that there is improved mixing over the cross-section of the tube.

A preferred helical tube portion of the pyrolysis tube has a substantially circular cross-section and a helical amplitude which is less than or equal to the internal diameter of the tube. With this arrangement, the desired improved mixing effect can be obtained without a relatively high pressure drop between the inlet and outlet to the furnace, as compared to the pressure drop which would be expected in the prior art proposals involving a twisted baffle or a high amplitude helix. The inventors have recognised that the benefits of swirl flow, such as to improve mixing, can be obtained without large pressure drops.

Pyrolysis tubes traditionally have a circular cross-section. When a circular cross-section tube is modified to have a portion with a helical centreline, the cross-section of the flow passage will be circular if measured perpendicularly to the helical centreline, or elliptical if measured perpendicularly to the central longitudinal axis of an envelope containing the helical tube portion. The reference to a substantially circular cross-section of the flow passage of the first aspect of the invention is intended to mean the shape when measured perpendicular to the helical centreline. Small variations from exact circularity are within the scope of the invention, particularly in view of the possibility that such variations may arise during the process of manufacturing the pyrolysis tube. The provision of a flow passage of substantially circular cross-section gives (or close to ideal) shape with a view to minimising flow resistance and hence pressure drop, particularly when compared to the known semi-circular flow passages.

In preferred embodiments of the second aspect of the invention it is preferred that the helical tube portion defines a flow passage with cross-section which is substantially circular (as understood in accordance with the paragraph above).

As a result of the improved mixing caused by swirl flow, the velocity profile of the flow across the tube is more uniform (or blunter) than it would be with flow in a conventional tube, with the swirling fluid tending to act as a plunger, scouring the tube walls. Further, the flow velocity near the wall of the tube is increased in comparison to a straight tube, giving a reduced boundary layer thickness which in itself improves heat transfer from the tube walls to the fluid within the tube.

The improved mixing, is of particular relevance when applied to a pyrolysis tube in a furnace, as it provides considerable mass, momentum and heat transfer in fluid within the core of the flow, and between fluid at the walls of the tube and fluid within the core. Thus, there is improved heat transfer from the wall of the pyrolysis tube to the feedstock flowing therein. This improved heat transfer allows greater yields of end-product to be achieved, or would allow the same yields to be achieved for less furnace fuel consumption and at lower tube metal temperatures. This improved heat transfer also effectively increases the capacity of the furnace in circumstances where, as is frequently the case, heat transfer is the limiting factor on the capacity of the furnace. Further, the lower tube metal temperatures are a benefit in prolonging the life of the pyrolysis tube which has to be replaced typically after five years.

Further, swirl Flow can reduce coking. The improved heat transfer mentioned above allows the pyrolysis reaction to be carried out with a lower pyrolysis tube wall temperature, and this reduced temperature will lead to reduced coking. In addition, the higher near-wall flow velocity reduces the chance of any coke being deposited (as the coke is more likely to be swept along by the swirl flow), and will also tend to remove any coke which has been deposited on the wall of the tube. As a decrease in coke deposition will increase the length of time for which the furnace can be used before requiring decoking, and thus increase the productivity of the furnace, the use of swirl flow in the pyrolysis tube can be extremely significant.

Preferably, the inside surface of the pyrolysis tube is substantially smooth, and may for example be coated with a low friction coating, such coatings being known as such. It is preferred to avoid surface features such as rifling, as this would lead to an increased length of the "wetted" perimeter and a consequent tendency for there to be increased flow resistance. It is known for conventional pyrolysis tubes (straight or curved in two dimensions only) to be provided with rifling and this can promote a swirl flow near to the inside surface of the tube. However, this is a relatively localised, near wall effect, which leaves a flow at the core where there is very little if any cross-mixing. Therefore, the improved heat transfer benefit of the present invention is not obtained. In a straight or two-dimensionally curved rifled tube the centreline is correspondingly straight or follows the two-dimensional curve.

In a preferred form, the pyrolysis tube is formed such that it has at least one portion whose centreline is formed as a helix with plural turns. If the centreline of the tube is formed as a helix (which curves in three dimensions) with plural turns, then swirl flow will continue along the tube, and the advantages will continue to be obtained.

Swirl flow is quickly established in a tube section whose centreline curves in three dimensions. The benefits of swirl flow discussed above may in certain circumstances be achieved by a pyrolysis tube portion the centreline of which curves in three dimensions over a short distance. However, if the tube then reverts to a normal section with a straight centreline, the swirl flow will die away and be replaced with normal flow. In certain preferred embodiments, therefore, the majority of the pyrolysis tube as it passes through the furnace has a helical centreline. For example, more than 20 or 30 or 40 or 50 or 60 or 70 or 80 or 90 percent, of the extent or the tube within the furnace may have a 3-D curved centreline. In some preferred embodiments, between 30 and 60 percent, or 30 and 50 percent, or 30 and 40 percent, or 40 and 60 percent, or 40 and 50 percent, or 50 and 60 percent, of the extent of the tube within the furnace has a 3-D curved centreline. In preferred embodiments of the first aspect of the invention, the location of the or each part of the pyrolysis tube having a helical centreline is determined in accordance with the teachings of that first aspect.

The pyrolysis tube may be formed such that its helix angle is constant, and this may be desirable from the point of view of simplifying manufacture of the pyrolysis tube.

However, it is also possible for the curvature to vary along the length of the pyrolysis tube. For example, the pyrolysis tube may have a plurality of helical tube portions, each tube portion having a different helical curvature. A variable curvature may be desirable as it enables the flow conditions to be varied along the tube. In accordance with the first aspect of the invention, it is desirable for the flow conditions in the upstream half of the pyrolysis tube (where the feedstock is relatively cool and significant cracking has not yet normally occurred) to differ from the flow conditions in the downstream half of the pyrolysis tube (where the feedstock is undergoing cracking or has been cracked and is relatively hot). Using a different curvature will allow the flow conditions to be varied.

A varying curvature also allows the pyrolysis tube to perform well across a wide range of flow conditions. Flow conditions may vary, for example based on the type of feedstock, with different types having different densities, viscosities and so forth. It would be possible to optimize the characteristics of the tube for a particular set of flow conditions, to achieve the best possible results; however, if the flow conditions were to vary from that particular set, the tube may perform suboptimally. In contrast, if the curvature varies along the length of the tube, then it is likely that some region of it will perform well for a given set of flow conditions (even if other regions perform less well), and this should allow the tube portion to be used across a larger range of flow conditions. In certain embodiments only part of the pyrolysis tube has a helical centreline; for example, a "U" shaped pyrolysis tube could have a straight inlet leg and an outlet leg with a helical; with the two legs being joined by a 2D bend.

In certain preferred embodiments, the pyrolysis tube is formed such that it has a portion with a straight centre line and a portion with a centre line which is helical.

Considering the centreline of the pyrolysis tube as a helical line, if the helix angle and helix amplitude are constant then the curvature is constant. If on the other hand the curvature is to be varied, then this can be achieved by a variation in the helix angle and/or a variation in the helix amplitude.

Of course, other characteristics of the tube, in addition to curvature, may vary along its length. These characteristics include the cross-sectional area of the tube portion, which may be constant or may vary, and its cross-sectional shape. In some embodiments it is preferred that the cross-sectional area increases at some point in the direction of flow, in order to accommodate the expansion effect of heating and the creation of more molecules by the cracking process. Preferably therefore the downstream half of the pyrolysis tube comprises a tube portion of greater cross-sectional area than that of a tube portion of the upstream half of the pyrolysis tube. This may be achieved by providing an expansion piece.

The angle of the helix (or pitch, where the pitch is the length of one turn of the helix, and can be defined in terms of the internal diameter of the tube) is also a relevant factor in influencing the flow. As with relative amplitude, the helix angle may be optimized according to the conditions. The helix angle is preferably less than or equal to 65°, more preferably less than or equal to 55°, 45°, 35°, 25°, 20°, 15°, 10° or 5°.

Generally speaking, for higher Reynolds numbers the helix angle may be smaller whilst satisfactory swirl flow is achieved, whilst with lower Reynolds numbers a higher helix angle will be required to produce satisfactory swirl. In the case of a lower amplitude helix, the use of higher helix angles for faster flows (with higher Reynolds numbers) will generally be undesirable, as there may be near wall pockets of stagnant fluid. Therefore, a given Reynolds number (or range of Reynolds numbers), the helix angle will preferably be chosen to be as low as possible to produce satisfactory swirl. In certain embodiments, the helix angle is less than 20°.

The helical pyrolysis tube portion may be regarded as being contained in an imaginary envelope which extends longitudinally and has a width equal to the swept width of the helical tube portion. The envelope may be regarded as having a central longitudinal axis, which may also be referred to as an axis of helical rotation. The preferred feature of the amplitude of the helical centre line being equal to or smaller than the internal diameter of the helical pyrolysis tube portion, in addition to achieving a manageable pressure drop, is beneficial for reasons of compactness, i.e. the swept width is not excessively large.

In certain preferred forms, the helical pyrolysis tube portion is formed as a low-amplitude helix. By "low-amplitude helix", we mean that the portion is formed such that its centreline follows a substantially helical path, and that the amplitude of the helix is equal to or less than one half of the internal diameter of the portion.

A tube formed as a low-amplitude helix in this manner is advantageous because it provides the advantages of swirl flow but does not take up a much greater volume than a straight tube, and so can easily be used in place of a straight tube. This is particularly helpful if the tubes are to be used in the refitting of an existing furnace, as the straight tubes can simply be replaced with low-amplitude helical tubes.

In a low amplitude helical section of this type, where the amplitude of the helix is less than one half of the internal diameter of the tube, there is a "line of sight" along the lumen of the tube. Even though the flow at the line of sight could potentially follow a straight path, it has been found that it generally has a swirl component.

The "relative amplitude" of the helical section is defined as the amplitude divided by the internal diameter. Since the amplitude of the helical tube is less than or equal to one half of the internal diameter of the tube, this means that the relative amplitude is less than or equal to 0.5. Relative amplitude's less than or equal to 0.45, 0.40, 0.35, 0.30, 0.25, 0.20, 0.15, 0.1 or 0.05 may be preferred. Smaller relative amplitudes provide a better use of available lateral space, in that the tube is not much wider overall than a normal straight tube with the same cross-sectional area. Smaller relative amplitudes also result in a wider "line of sight", providing more space for the insertion of equipment along the tube (which may be useful when cleaning the tube). However, very small relative amplitudes can in some circumstances lead to reduced secondary motion and mixing.

With higher Reynolds numbers, smaller relative amplitudes may be used whilst swirl flow is induced to a satisfactory extent. This will generally mean that, for a given internal diameter, where there is a high flow rate a low relative amplitude can be used whilst still being sufficient to induce swirl flow.

In certain preferred embodiments, the amplitude of the helical centre line is greater than or equal to one half of the internal diameter of the pyrolysis tube portion. In preferred embodiments the amplitude is less than or equal to the internal diameter of the pyrolysis tube portion, and is greater than or equal to the internal diameter. At this higher range of amplitude values, good mixing of the process gases is obtained, with the advantages discussed of minimising back reaction, and although the higher range of amplitudes will tend to increase the amount of pressure drop, this is generally acceptable providing the helix angle is not too high. It is therefore preferred for the embodiments in which the helical amplitude is between half and one internal diameter of the tube, that the helix angle of the helical centre line is less than or equal to 20°. Helix angles of less than 15° or 10° or 5° may be preferable in certain circumstances. In some embodiments, the helix angle may be in the range of 5° to 20° or 5° to 15° or 5° to 10°, or 10° to 15° or 10° to 20°, or 15° to 20°.

In some preferred embodiments the pyrolysis tube is supported, either by being fixed or by being guided, where it enters the furnace and where it exits the furnace and is otherwise unsupported. This will normally be the case for example for pyrolysis tubes which extend generally vertically in a furnace, whether with a single pass from top to bottom or bottom to top. Certain straight through or single pass tubes may be fixed at the bottom end and only guided at the top where they connect directly to a quench exchanger. U-coils may be supported at the top and bottom only, or may additionally have an intermediate support at the "U"-bend. "M"-coils or "W"-coils may be supported at the inlet and outlet with supports also being provided at intermediate points.

In some preferred embodiments the pyrolysis tube may extend generally horizontally. In these arrangements, the tube may be supported at its inlet and outlet ends and also at one or more intermediate points during its passage through the furnace.

The pyrolysis tube is preferably exposed directly to the heat of the furnace, i.e. it will not be contained in a housing which is itself disposed in the furnace.

In preferred embodiments of the invention, the pyrolysis tube consists of a single flow passage from the inlet to the outlet. Preferably, there is no splitting of the flow passage by baffles. Preferably there are no "Y" junctions where the flow is split into plural passages or brought together from plural passages to one passage.

BRIEF DESCRIPTION OF THE DRAWINGS

Certain preferred embodiments of the invention will now be described by way of example only and with reference to the accompanying drawings, in which.

DETAILED DESCRIPTION

Figure 1:
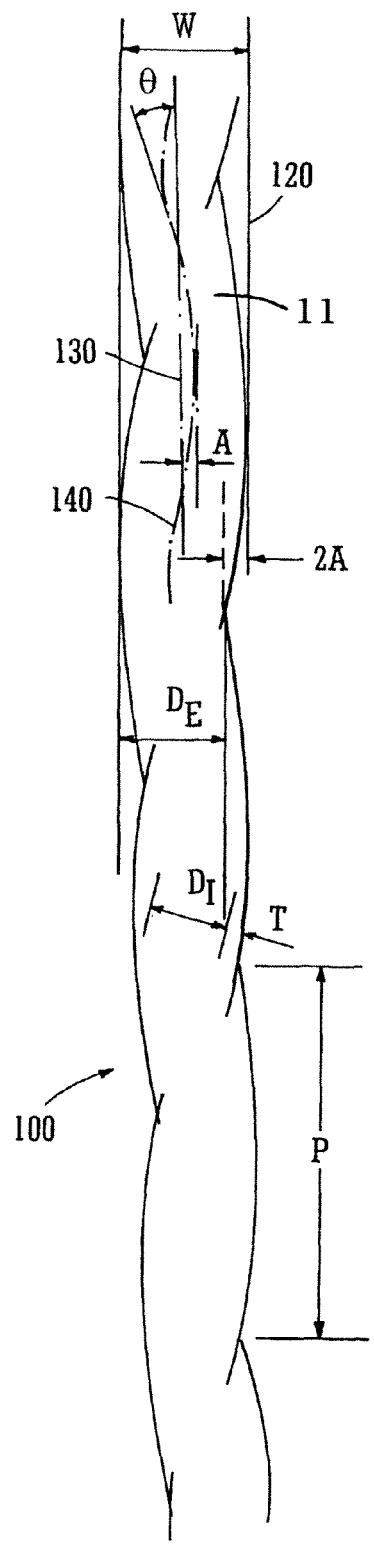
FIG. 1 is a view of a helical tube portion of a pyrolysis tube.

A helical pyrolysis tube portion is shown in FIG. 1. This tubing 100 has a circular cross-section, an external diameter DE, an internal diameter DI and a wall thickness T. The tubing defines a flow passage 11 with a substantially circular cross-section. The tubing is coiled into a helix of constant amplitude A (as measured from mean to extreme), constant pitch P, constant helix angle 9 and a swept width W. The tubing 100 is contained in an imaginary envelope 120 which extends longitudinally and has a width equal to the swept width W of the helix. The envelope 120 may be regarded as having a central longitudinal axis 130, which may also be referred to as an axis of helical rotation. The illustrated tubing 100 has a straight axis 130, but it will be appreciated that the central axis may be curved, or indeed may take any shape depending on requirements. The tubing has a centre line 140 which follows a helical path about the central longitudinal axis 130.

It will be seen that the amplitude A is less than half the tubing internal diameter $D_I$. By keeping the amplitude below this size, the lateral space occupied by the tubing and the overall length of the tubing can be kept relatively small, whilst at the same time the helical configuration of the tubing promotes swirl flow of fluid along the tubing. Mi.'s also provides a relatively wide lumen along the tubing, which allows instruments, apparatus and the like to be passed down the tubing. However the first and second aspects of the invention are not limited to helical pyrolysis tube portions in which the amplitude is less than half the tubing internal diameter, and are also applicable to pyrolysis tubes having helical tube portions with a helical amplitude greater than or equal to half the tubing internal diameter, for example amplitudes which are less than or equal to the tubing internal diameter, or even larger.

Figure 2:
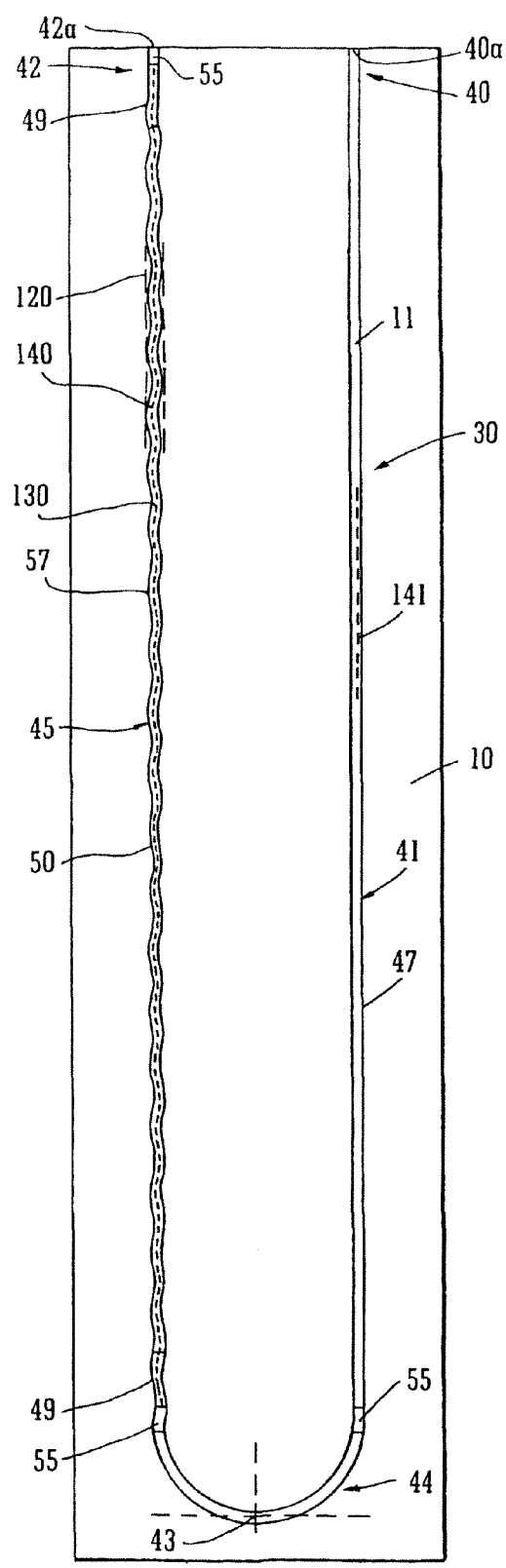
FIGS. 2, 3 and 4 are schematic cross-sectional views of cracking furnaces with pyrolysis tubes.

The pyrolysis tube 30 shown in FIG. 2 is generally U-shaped, having an inlet portion 40, an outlet portion 42 and a "U" bend portion 44. The pyrolysis tube defines a flow passage 11 with a circular cross-section. The pyrolysis tube 30 extends in the furnace 10 from an inlet 40a to an outlet 42a. An upstream half 41 of the pyrolysis tube may be considered as that part of the tube which extends from the inlet 40a to the mid-point or the "U" bend portion 44, the mid-point being shown as 43. The downstream half 45 of the pyrolysis tube may be considered as that part of the pyrolysis tube extending from the mid-point 43 of the "U" bend portion 44 to the outlet 42a. The length of the central longitudinal axis 130 of the envelope 120 is the same For the upstream half, of the pyrolysis tube as for the downstream half. It will be appreciated that where the tube is non-helical the envelope corresponds to the outer surface 57 of the pyrolysis tube.

The upstream half 41 of the pyrolysis tube includes a generally straight section 47 with a straight centreline 141. This means that the central longitudinal axis of the envelope containing the pyrolysis tube is coincident with the straight centreline 141 of the circular cross-section flow passage 11 defined by the tube. The downstream half 45 of the pyrolysis tube includes a helical portion 50, i.e. a portion in which the tube and the flow passage which it defines have a helical centreline 140. Between the "U" bend portion 44 and the helical portion 50 there is provided a transitional portion 49, described later in more detail. A transitional portion 49 is also provided between the curved portion 50 and a straight portion 55 forming part of the outlet portion 42.

In use, feedstock and steam enter the furnace 10 at the inlet 40a and are heated up as they progress along the straight-section-47 of the upstream-half-4-1-of-the pyrolysis tube. In this upstream portion there is a large difference in temperature between the process gases and the furnace and so rapid heating of the process gases is achieved in a conventional manner. Because the pyrolysis tube in the upstream half is generally straight, pressure losses are within normal and acceptable limits. After the process gases have passed around the "U" bend portion 44 they enter the transitional portion 49 and there is a transition of the flow as it exits the "U" bend in to a swirling flow. Typically at this point the process gases have reached reaction temperature and cracking of the larger hydrocarbon molecules is taking place. Once the flow is swirling there is substantial mixing of the water vapour molecules with the molecules which are the product of the reactions. This mixing serves to minimise back reaction and hence the helical portion 50 serves to increase the yield of the cracking process.

Figure 3:
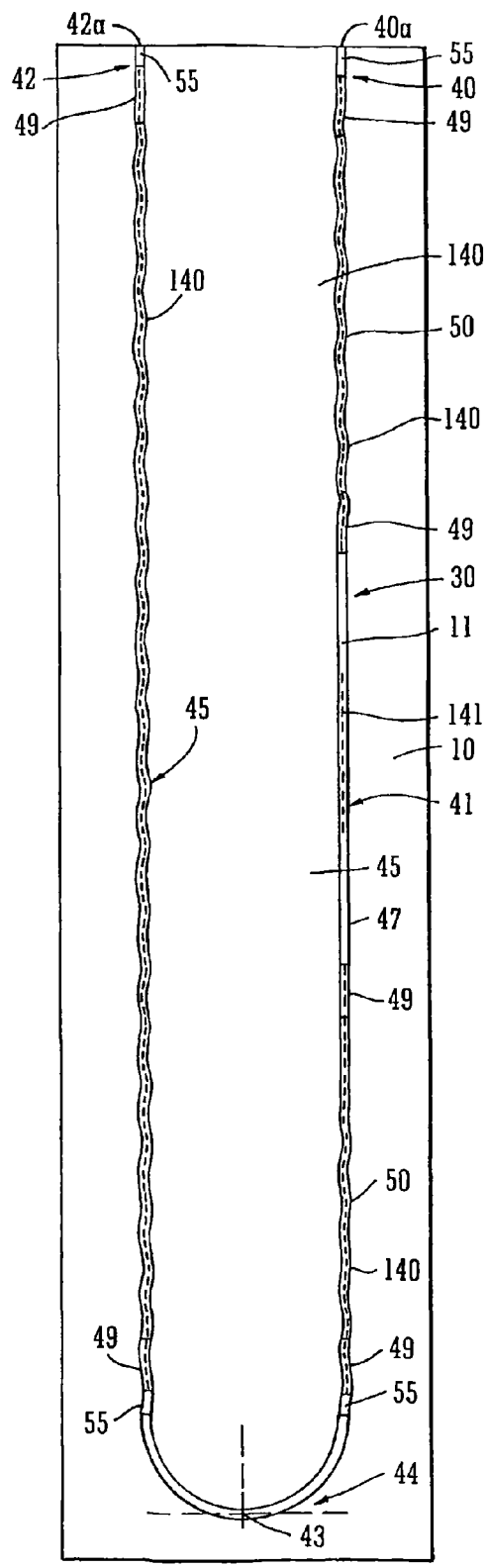

FIG. 3 shows a furnace 10 with a different configuration of pyrolysis tube 30. In this case the upstream half 41 of the pyrolysis tube includes two helical portions 50, as well as a straight section 47 between the helical portions 50. The straight section 47 is connected at each end to the respective helical portion 50 via a transitional portion 49. The downstream half 45 of the pyrolysis tube has a helical portion 50 which extends from the "U" bend portion 44 to the outlet portion 42.

Thus the downstream half 45 of the pyrolysis tube comprises a greater amount of helical passage than the upstream half 41.

In use, the helical portions 50 provided in the upstream half serve to generate swirl flow, resulting in cross-mixing and hence a more rapid transfer of heat from the furnace across the tube wall to the process gases. However, since in this upstream half 41 the temperature gradient across the tube wall is large, it is not necessary to provide a helical passage along the whole length of the upstream half. By using a reduced amount of helical passage, the pressure drop caused by the use of a helical passage in the upstream half can be reduced.

Figure 4:
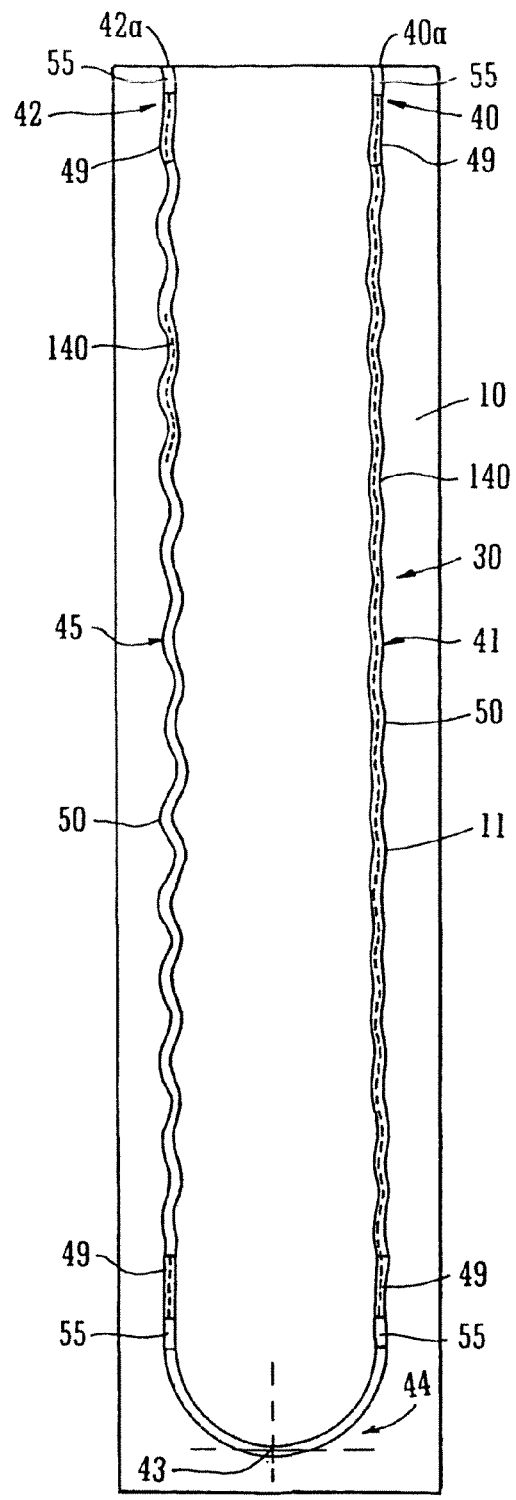

FIG. 4 shows another embodiment of a generally "U" shaped pyrolysis tube. In this case the upstream half 41 of the tube has a helical portion 50 extending from the inlet portion 40 to the "U" bend portion 44 (with appropriate transitional portions 49 provided between the non-helical and the helical portions.) In the downstream half 45 of the pyrolysis tube a downstream helical portion 50 extends from the "U" bend portion 44 to the outlet portion 42, again with transitional portions 49 being provided between the non-helical and helical portions. In the example shown, the upstream helical portion 50 and the downstream helical portion 50 have the same pitch as each other, but the amplitude of the upstream helical portion 50 is smaller than that of the downstream helical portion 50. Thus the length of the helical centreline 140 in the downstream helical portion 56 is greater than the length of the helical centreline in the upstream helical portion 50. There is therefore a greater amount of the helical passage in the downstream half of the length of the pyrolysis tube than in the upstream half of the length of the pyrolysis tube. In another example (not shown) the pitch in the downstream helical portion 50 could be smaller (i.e. greater helix angle) than that in the upstream helical portion 50, thereby providing a greater length of the helical centreline 140 in the downstream helical portion 50 than the length of the helical centreline in the upstream helical portion 50.

In use of the furnace of FIG. 4, the upstream helical portion 50 serves to induce swirl flow in the process gases. This results in cross-mixing in the flow and improved heat transfer. However, since-in this upstream half 41 the temperature gradient across the tube wall is large, the amplitude of the helix can be relatively low. When the process gases pass through the downstream helical portion 50 swirl flow is induced and because of the greater helical amplitude there is an increased level of cross-mixing. A major benefit of the cross-mixing in the downstream half of the pyrolysis tube is that molecules which are the product of the cracking process are well mixed with the diluent water vapour molecules and so the tendency for back reaction is minimised. The greater helical amplitude in the downstream helical portion 50 provides this benefit, whilst the use of a smaller helical amplitude in the upstream helical portion 50 reduces the pressure loss which would incur in the case of a larger helical amplitude.

Figure 5:
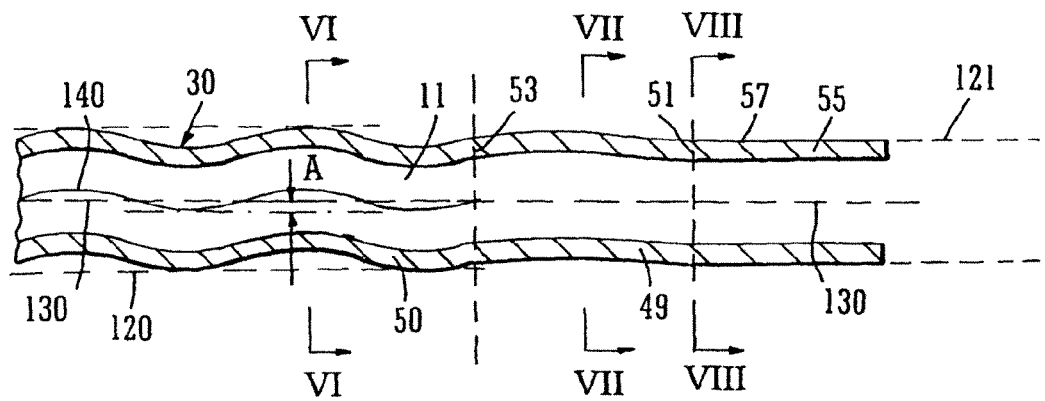
FIG. 5 is a longitudinal cross-sectional view of the end of a helical tube portion where it joins a transitional tube portion.

FIG. 5 shows the region where a helical tube portion 50 joins with a non-helical tube portion 55. The helical portion 50 defines a helical flow passage 11 and is itself contained in an imaginary envelope 120 having a central longitudinal axis 130. The helical tubing portion 50 and the flow passage 11 which it defines have a helical centreline 140 following a helical path about the central longitudinal axis 130. The helical centreline has a helical amplitude A.

A transitional portion 49 of the pyrolysis tube is located axially adjacent to the helical portion 50, being either integrally formed with helical portion 50 or butt welded thereto. In the transitional portion 49 the amplitude reduces towards an end 51 remote from helical portion 50. At the end 53 of the transitional portion 49 which adjoins helical portion 50 the amplitude of the helical centreline of the transitional portion 49 is the same as the amplitude A in the helical portion 50. At the remote end 51 the amplitude has reduced to zero.

A non-helical or straight portion 55 of the pyrolysis tube is located axially adjacent to the transitional portion 49. The central axis 130 of this straight tube portion 55 is the same as the central axis 130 of envelope 120. The envelope 121 of straight portion 55 is defined by the outer surface 57 of the pyrolysis tube, and for explanation purposes this envelope is shown extended at dotted lines 121.

Figure 6:
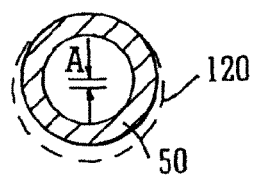
FIGS. 6, 7 and 8 are respective cross-sections on the lines VI-VI, VII-VII and VIII-VIII of FIG. 5.
Figure 7:
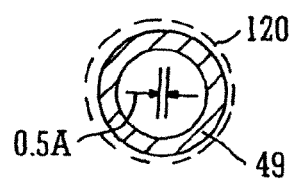
Figure 8:
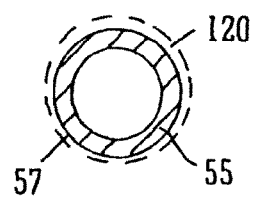

FIGS. 6, 7 and 8 show transverse cross-sections through the pyrolysis tube 30 of FIG. 5. In FIG. 6, it can be seen that the amplitude of the helical centreline 140 is A, whilst in FIG. 7, halfway along the axial length of the transitional portion 49 the amplitude has reduced to 0.5 A At the end 51 of the transitional portion 49 the amplitude has reduced to zero.

The arrangement of FIGS. 5-8 can be used at the inlet to or outlet from a furnace, for example at the outlet 42 of the pyrolysis tube shown in FIG. 2, at the inlet 40 and/or the outlet 42 of the pyrolysis tube shown in FIG. 3, and at the inlet 40 and/or the outlet 42 of the pyrolysis tube shown in FIG. 4. In each case the helical centreline 140 of the helical portion continues into the transitional portion 49 where the amplitude of the helical centreline reduces to zero and so comes into alignment with the central longitudinal axis 130 of the envelope 120 of the helical portion 50. The helical portion is therefore supported at the inlet and/or outlet of the furnace symmetrically with respect to the central longitudinal axis, thereby avoiding or minimising a bending moment at the support which would otherwise be caused by an offset supporting arrangement. In addition the flow into or out of the helical portion 50 can undergo a progressive transition in the transitional portion 49. Further, if the pyrolysis tube is being used as a replacement for a conventional tube not having helical portions, the centering effect of the transitional tube portion 49 ensures that the replacement tube will have its central longitudinal axis in the same position as the central axis of the (usually straight) tube portion which it replaces.

Therefore where, as is usual, multiple tubes are being replaced, the new tubes should fit properly into place.

The invention claimed is:

1. A cracking furnace with at least one pyrolysis tube passing through the furnace, the at least one pyrolysis tube passing through the furnace defining a flow passage with a cross-section which is substantially circular, the flow passage having a centreline which is helical over at least part of the extent of the at least one pyrolysis tube extending in the furnace, wherein a downstream half of said extent of the at least one pyrolysis tube extending in the furnace comprises a greater amount of helical passage than an upstream half of said extent of the at least one pyrolysis tube passing through the furnace, wherein at least 30 percent of the upstream half of the at least one pyrolysis tube passing through the furnace comprises a non-helical passage.

2. A cracking furnace as claimed in claim 1, wherein at least 50 percent of the upstream half of the at least one pyrolysis tube passing through the furnace comprises a non-helical passage.

3. A cracking furnace as claimed in claim 1, wherein substantially the entire upstream half of the at least one pyrolysis tube passing through the furnace comprises a non-helical passage.

4. A cracking furnace as claimed in claim 1, wherein the upstream half of the at least one pyrolysis tube passing through the furnace comprises at least one helical tube portion with a helical centreline.

5. A cracking furnace as claimed in claim 1, wherein at least 30 percent of the downstream half of the at least one pyrolysis tube passing through the furnace comprises a helical passage.

6. A cracking furnace as claimed in claim 1, wherein at least 50 percent of the downstream half of the at least one pyrolysis tube passing through the furnace comprises a helical passage.

7. A cracking furnace as claimed in claim 1, wherein substantially the entire downstream half of the at least one pyrolysis tube passing through the furnace comprises a helical passage.

8. A cracking furnace as claimed in claim 1, wherein the downstream half of the at least one pyrolysis tube passing through the furnace comprises at least one non-helical tube portion.

9. A cracking furnace as claimed in claim 1, wherein the at least one pyrolysis tube passing through the furnace is "U" shaped, wherein said upstream half of the at least one pyrolysis tube passing through the furnace comprises a first leg of the "U" in which there is at least one tube portion defining a flow passage with a substantially straight centreline, and wherein said downstream half of the at least one pyrolysis tube passing through the furnace comprises a second leg of the "U" in which there is at least one tube portion defining a flow passage with a helical centreline.

10. A cracking furnace as claimed claim 1, wherein a part of the at least one pyrolysis tube passing through the furnace defining a flow passage with a helical centreline is a helical tube portion, and wherein the at least one pyrolysis tube passing through the furnace further comprises a transitional portion longitudinally adjacent to the helical tube portion, the centreline of the flow passage in the transitional tube portion following a helical path and the amplitude of the helical centreline in the transitional tube portion reducing in a direction away from the helical tube portion.

11. A cracking furnace with at least one pyrolysis tube passing through the furnace, the at least one pyrolysis tube passing through the furnace defining a flow passage, and the at least one pyrolysis tube passing through the furnace comprising a helical tube portion in which the centreline of the flow passage follows a helical path, and the at least one pyrolysis tube passing through the furnace comprising a transitional tube portion longitudinally adjacent to the helical tube portion, the centreline of the flow passage in the transitional tube portion being substantially aligned with the helical centreline of the helical tube portion at a first end of the transitional tube portion adjacent to the helical tube portion, and the centreline of the flow passage in the transitional tube portion being substantially aligned with the central longitudinal axis of an envelope of the helical tube portion, said envelope being an imaginary envelope extending longitudinally and having a swept width equal to a swept width of the helical tube portion, at a second end of the transitional tube portion remote from the helical tube portion, wherein the centreline of the flow passage in the transitional tube portion follows a helical path, and wherein the amplitude of the helical centreline in the transitional tube portion reduces in a direction away from the helical tube portion to substantially zero so as to bring the centreline of the flow passage in the transitional tube portion substantially into alignment with the central longitudinal axis.

12. A cracking furnace as claimed in claim 11, wherein a said transitional tube portion is provided at an inlet end of the at least one pyrolysis tube passing through the furnace.

13. A cracking furnace as claimed in claim 11, wherein a said transitional tube portion is provided at an outlet end of the at least one pyrolysis tube passing through the furnace.

14. A cracking furnace as claimed in claim 1, wherein the at least one pyrolysis tube passing through the furnace has a circular cross-section and an internal diameter, and wherein the helical centerline of the flow passage has an amplitude, said amplitude being less than or equal to said internal diameter of the at least one pyrolysis tube passing through the furnace.

15. A cracking furnace as claimed in claim 1, wherein the helical centerline of the flow passage has a helix angle and wherein the helix angle is less than or equal to 65°.

16. A cracking furnace as claimed in claim 1, wherein the helical centerline of the flow passage has a helix angle and wherein the helix angle is less than or equal to 20°.

17. A cracking furnace as claimed in claim 1, wherein at least 30 percent of the upstream half of the at least one pyrolysis tube passing through the furnace comprises a non-helical passage and wherein at least 30 percent of the downstream half of the at least one pyrolysis tube passing through the furnace comprises a helical passage.

18. A cracking furnace as claimed in claim 1, wherein at least 50 percent of the upstream half of the at least one pyrolysis tube passing through the furnace comprises a non-helical passage and wherein at least 50 percent of the downstream half of the at least one pyrolysis tube passing through the furnace comprises a helical passage.

* * * * *